United States Patent [19]

Haydon

[11] 4,244,099
[45] Jan. 13, 1981

[54] METHOD OF MAKING AN ELECTRIC ROTATING MACHINE

[75] Inventor: Arthur W. Haydon, Middlebury, Conn.

[73] Assignee: Tri-Tech, Inc., Waterbury, Conn.

[21] Appl. No.: 2,807

[22] Filed: Jan. 11, 1979

[51] Int. Cl.³ .......................................... H02K 15/14
[52] U.S. Cl. ...................................... 29/596; 310/42; 310/83; 310/89
[58] Field of Search ................... 29/596, 598; 310/83, 310/89, 91, 42, 164

[56] References Cited

U.S. PATENT DOCUMENTS

| | | | |
|---|---|---|---|
| 1,614,031 | 1/1927 | Holmes | 310/83 X |
| 1,651,995 | 12/1927 | Casey | 310/83 X |
| 2,171,987 | 9/1939 | Poole | 310/83 |
| 3,153,158 | 10/1964 | Schmitter | 310/83 |
| 3,475,630 | 10/1969 | Heinzen et al. | 310/43 |
| 3,495,113 | 2/1970 | Haydon | 310/164 |
| 3,564,314 | 2/1971 | Haydon | 310/156 |
| 4,087,709 | 5/1978 | Hayden | 310/83 |

Primary Examiner—Carl E. Hall

Attorney, Agent, or Firm—Lee C. Robinson, Jr.

[57] ABSTRACT

An electric motor and method of making the motor, in which a unitary one-piece cylindrical housing is molded of nonmagnetic material with an H-shaped axial cross-section to provide cylindrical recesses in opposite ends of the housing. A gear train is inserted in one of these recesses, and a rotor assembly and a centrally orificed stator are inserted in the other recess. The stator is in the form of a sub-assembly having a plurality of annular pole pieces stacked in oppositely disposed relationship with each other. Each of these pole pieces has only a single salient stator pole projecting perpendicularly from adjacent the margin of the stator orifice, and the pole pieces are stacked such that the stator poles project in opposite directions and are arranged in diametrically opposed pairs to form a cylindrical array. Two of the pole pieces are provided with peripheral flanges to form a cylindrical enclosure for the energizing winding of the motor. The rotor assembly is located within the central orifice of the stator and includes a stationary nonmagnetic cover, a nonsalient pole rotor within the cover, and a rotor shaft which extends into the cylindrical recess for the gear train.

11 Claims, 6 Drawing Figures

METHOD OF MAKING AN ELECTRIC ROTATING MACHINE

BACKGROUND OF THE INVENTION

This invention relates to electric rotating machines and to a method of making the same.

The present invention, while of general application, is particularly well suited for use as a fractional horsepower motor. Motors having related electromagnetic characteristics but of different physical configuration are disclosed, for example, in A.W. Haydon U.S. Pat. Nos. 3,495,113 granted Feb. 10, 1970, 3,495,111 also granted Feb. 10, 1970, 3,564,214 granted Feb. 16, 1971, 3,909,646 granted Sept. 30, 1975, 4,004,168 granted Jan. 18, 1977 and 4,087,709 granted May 2, 1978. Such motors customarily utilize a two pole rotor and a plurality of salient stator poles arranged around the rotor to provide a nonuniform air gap therebetween. Certain of the stator poles are shaded, and this feature, together with the nonuniform air gap and the unique design of the rotor, results in a motor which begins rotating substantially instantaneously in response to the energization of the surrounding field coil.

Heretofore, difficulties were encountered in the manufacture of fractional horsepower motors and other electric rotating machines particularly on a mass production basis. As an illustration, the assembly of the machines was unnecessarily time consuming and often required complex tooling and excessive handling of the individual machine components. In addition, electric rotating machines of the type previously employed frequently were made from a comparatively large number of separate parts which each needed to be fabricated and fitted together in operable relationship with the remaining parts. Still further difficulties arose heretofore in cases in which weight limitations were placed on the machines, and in several instances the overall weight of the machine was excessive for the particular application.

SUMMARY

One general object of the invention, therefore, is to provide a new and improved electric motor or other electric rotating machine.

Another object of the invention is to provide a novel method of making an electric rotating machine.

More specifically, it is an object of this invention to provide an electric rotating machine of the character indicated which may be quickly and easily assembled on a mass production basis.

A further object of the invention is to provide such electric rotating machine having a reduced number of component parts.

Still another object of the invention is to provide an electric rotating machine having comparatively simple mechanical and electrical components which is economical to manufacture and thoroughly reliable in operation.

In one illustrative embodiment of the invention, the machine includes a single cylindrical housing which encloses both the stator assembly, the rotor assembly and the gear train of the machine. The rotor assembly and the gear train are inserted in the housing, and the stator assembly is provided with a central orifice such that it may be located in the housing around the rotor. To form the stator assembly a plurality of annular pole pieces are stacked in oppositely disposed relationship with each other. Each of these pole pieces has a salient stator pole projecting perpendicularly from the face of the pole piece, and the pole pieces are stacked so that the stator poles project in opposite directions and are arranged in diametrically opposed pairs to form a cylindrical array. Two of the pole pieces are provided with peripheral flanges to form a cylindrical enclosure for the energizing winding of the machine.

In accordance with one feature of the invention, the housing is of H-shaped axial cross-section to define cylindrical recesses in its opposite ends. The rotor and gear train assembly are respectively located in the two recesses, the housing is oriented with the recess containing the rotor extending in an upward direction, and the stator assembly is positioned around the rotor. As a result of the unique way in which the machine is assembled, it may be mass-produced in a rapid and straightforward manner without excessively handling of the individual components.

In accordance with another feature of the invention, in certain particularly important embodiments, the housing is molded or otherwise formed of nonmagnetic material and is of unitary one-piece construction. The resulting simplification in the manufacturing process provides a substantial reduction in the overall cost of the machine.

In accordance with still another feature of certain preferred arrangements in accordance with the invention, the rotor assembly includes a stationary nonmagnetic cover which supports the rotor shaft. The cover fully encloses the rotor and prevents dirt or other foreign matter from accumulating between the relatively movable rotor and stator poles.

The foregoing and other objects, features and advantages of the invention will be more readily understood from the following description of a preferred embodiment thereof, when read with reference to the accompanying drawings.

DESCRIPTION OF A PREFERRED EMDODIMENT

Figure 1:
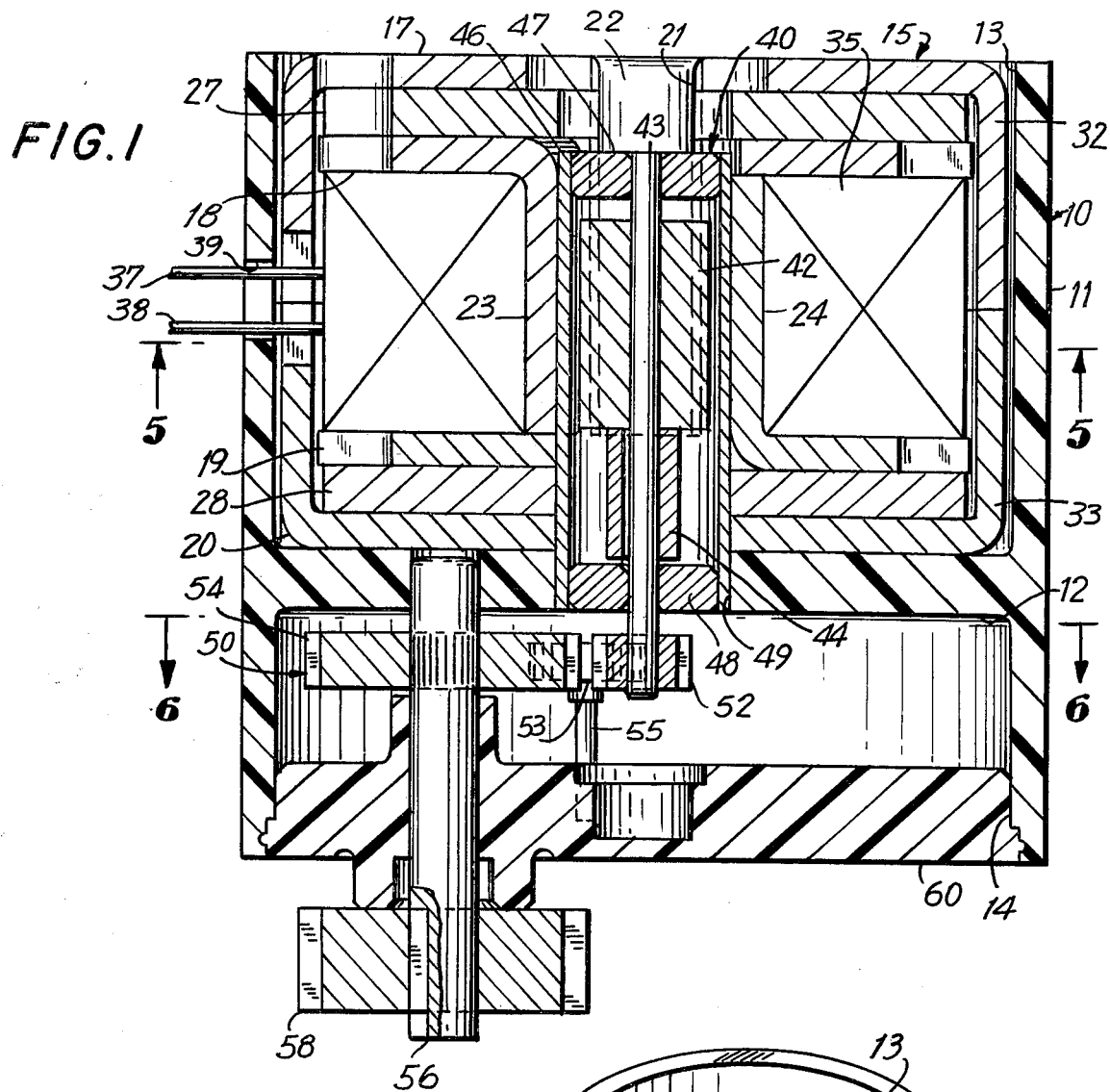
FIG. 1 is a vertical section view of an electric motor in accordance with an ilustrative embodiment of the invention.
Figure 2:
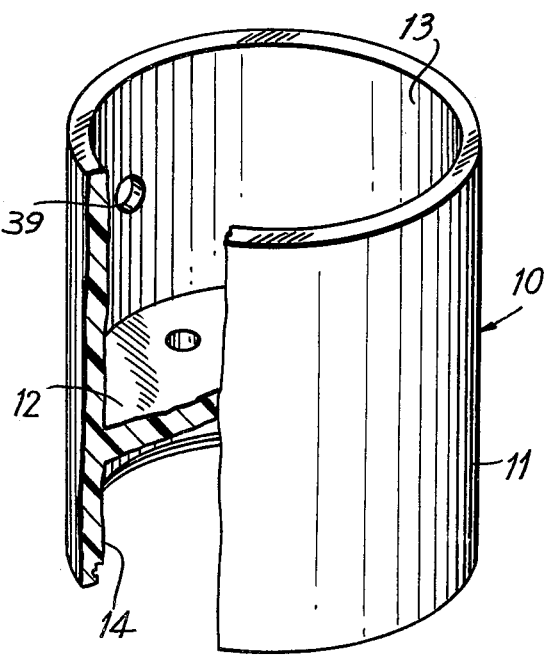
FIG. 2 is a perspective view, with a portion shown broken away and in section, a unitary one-piece housing for the motor of FIG. 1.
Figure 4:
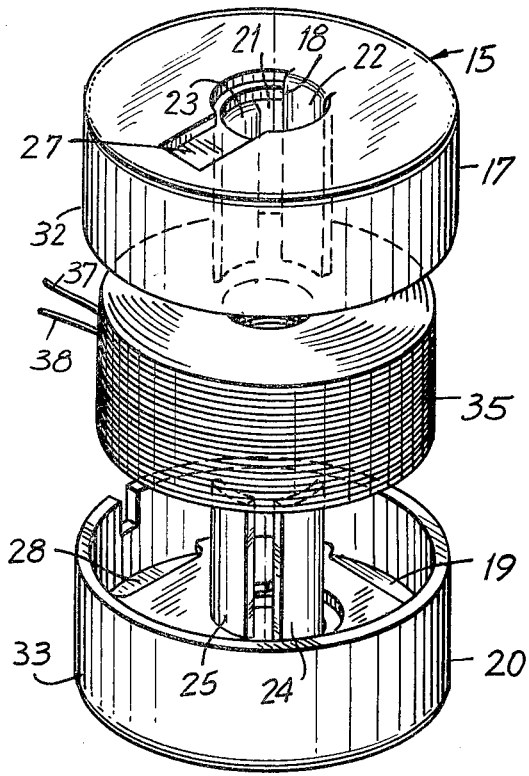
FIG. 4 is an exploded perspective view showing the insertion of the stator assembly for the motor into the housing.
Figure 3:
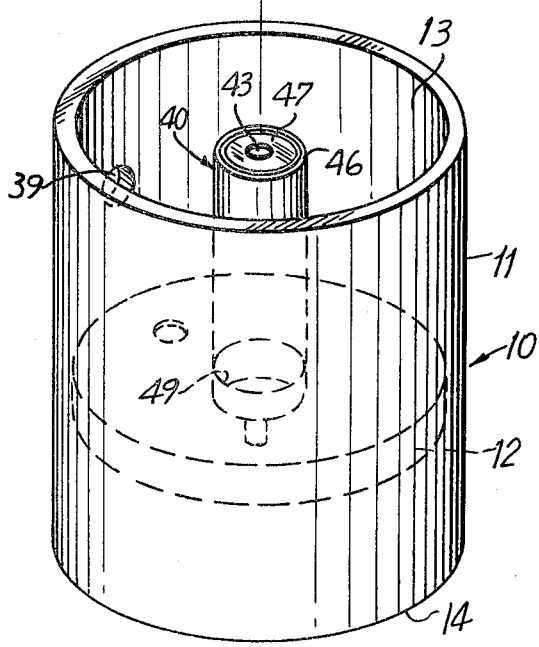
FIG. 3 is an exploded perspective view of the housing together with the rotor assembly and gear train of the motor.
Figure 3:
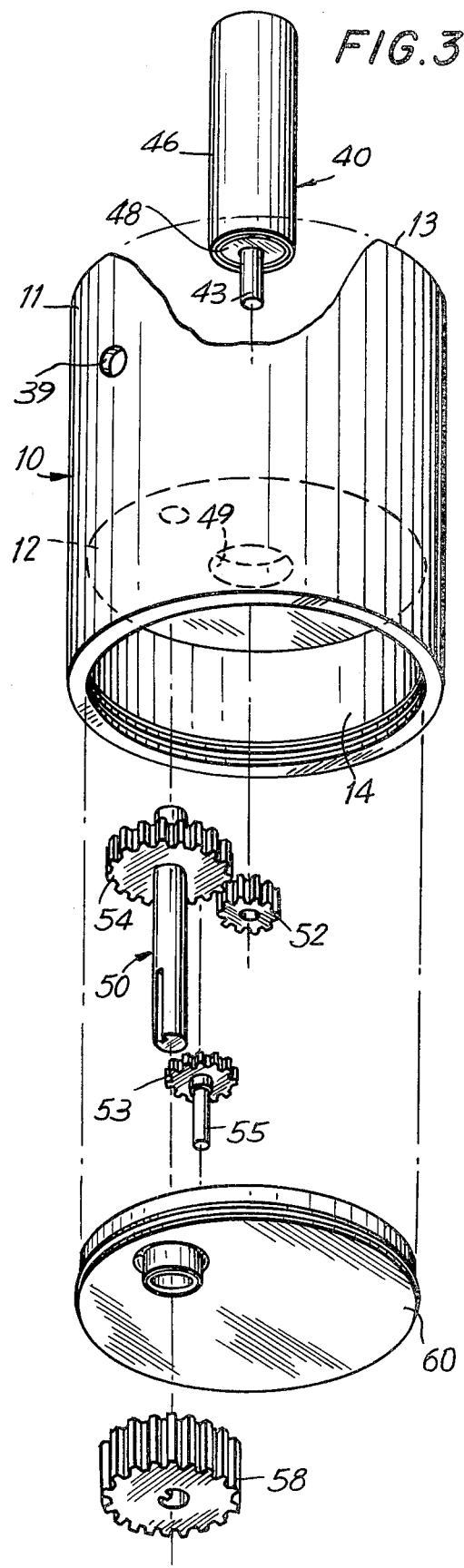

Referring to FIGS. 1 and 2 of the drawings,s each of the various parts of the motor is enclosed with a unitary one-piece cylindrical housing indicated generally at 10. The housing 10 is molded from thermoplastic or other non-magnetic, nonconductive material and includes a cylindrical side wall 11 and an intermediate radially extending flange 12. One particularly advantageous thermoplastic having these properties is the acetal material available commercially from E.I. DuPont de Nemours & Co. under its trade name DELRIN 507. As best shown in FIG. 1, the housing 10 is of generally H-shaped axial cross section, and the flange 12 separates the interior of the housing into two cylindrical recesses 13 and 14 at its opposite ends.

A multi-part centrally orificed stator assembly 15 is located within the housing recess 13. The assembly 15 is similar in several respects to the stator structure disclosed in A. W. Haydon U.S. Pat. No. 3,495,113 referred to above and includes four pole piece members 17, 18, 19 and 20 which are stacked in oppositely disposed pairs. Each of these pole piece members comprises an annular disc and only a single salient stator pole extending pependicularly from the inner periphery of the disc. The central orifice defined by the stacked pole pieces 17, 18, 19 and 20 is identified in the drawings by the reference character 21, and the stator poles themselves are identified by the reference characters 22, 23, 24 and 25, respectively. As will be understood, each pole piece with its attendant stator pole is stamped or otherwise formed from a single sheet of a magnetically conductive material such as cold rolled steel, for example, and the stator pole is then bent at right angles to the sheet.

Two shading rings 27 and 28 are associated with the respective pole pieces 17 and 20. Each of the rings 27 and 28 comprises an annular disc of copper, aluminum, silver or other suitable conductive but essentially nonmagnetic material. The ring 27 is sandwiched between the pole piece discs 17 and 18, while the ring 28 is sandwiched between the pole piece discs 19 and 20. With this arrangement, the build-up of magnetic flux in the stator poles 22 and 25 is delayed relative to the flux build-up in the stator poles 23 and 24.

The pole pieces 17 and 20 are provided with integrally formed peripheral flanges 32 and 33, respectively. The pole pieces 17 and 20 are thus of cup-shaped configuration and are oppositely disposed to provide a cylindrical enclosure for the energizing winding 35 of the motor. The winding 35 is located within this enclosure around the salient stator poles 22, 23, 24 and 25 and is provided with terminal wires 37 and 38 which extend through an opening 39 in the cylindrical side wall of the housing 10. In cases in which the machine is operated as a synchronous motor, the wires 37 and 38 are supplied with alternating current, illustratively at a frequency of 60 cycles per second, from a suitable power source.

Figure 5:
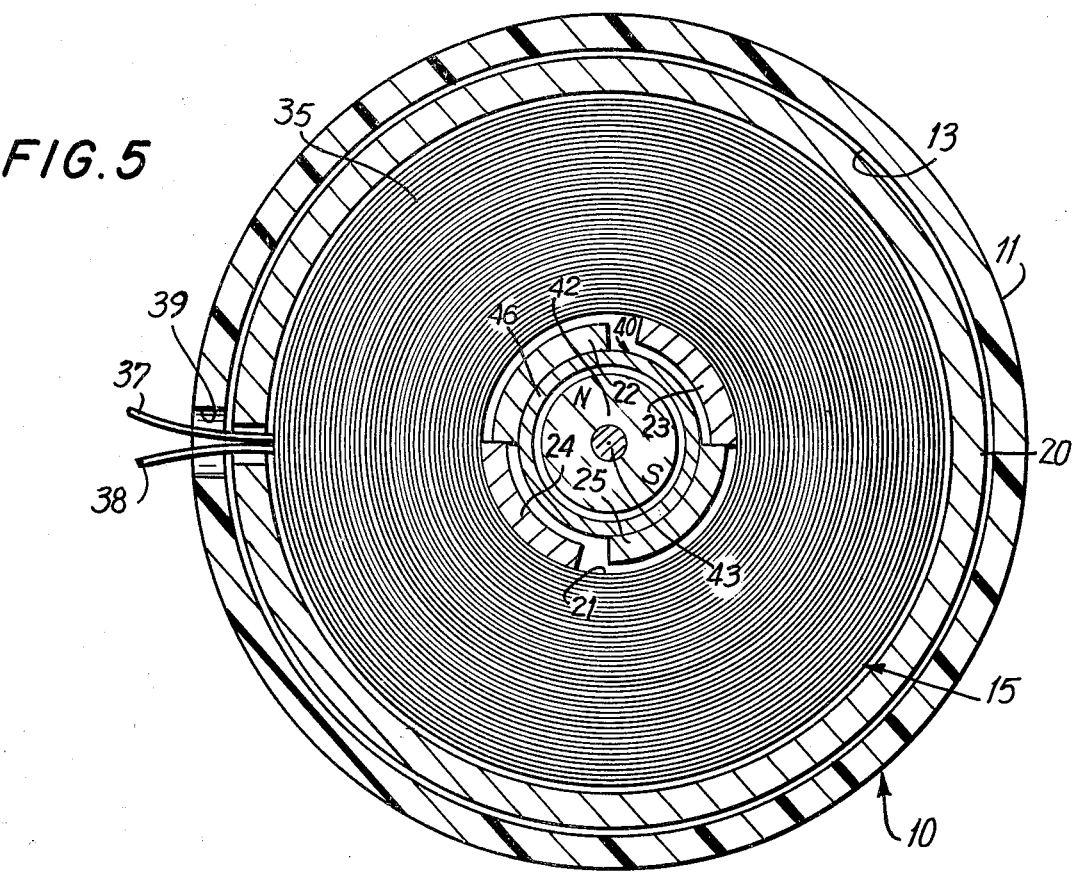
FIG. 5 is a sectional view taken along the line 5—5 in FIG. 1.

Coaxially mounted in the housing recess 13 within the central orifice 21 is a rotor assembly 40. The assembly 40 includes a nonsalient pole rotor 42 in the form of a long slim cylinder of barium ferrite or other ceramic magnetic material which is magnetized permanently with a single pair of north and south poles, as indicted by N and S in FIG. 5 of the drawings. The rotor material is magnetically "hard" and exhibits high coercivity, low permeability, a high magnetic energy product, a low specific gravity and low inertia. This latter characteristic is achieved by utilizing a rotor having an axial length in excess of its diameter, and preferably a ratio of rotor diameter to rotor length of at least about 1.25 to 1, and is particularly advantageous in cases in which the motor is used for timing or other applications where it is desired to achieve substantially instantaneous starting and stopping of the rotor.

Figure 6:
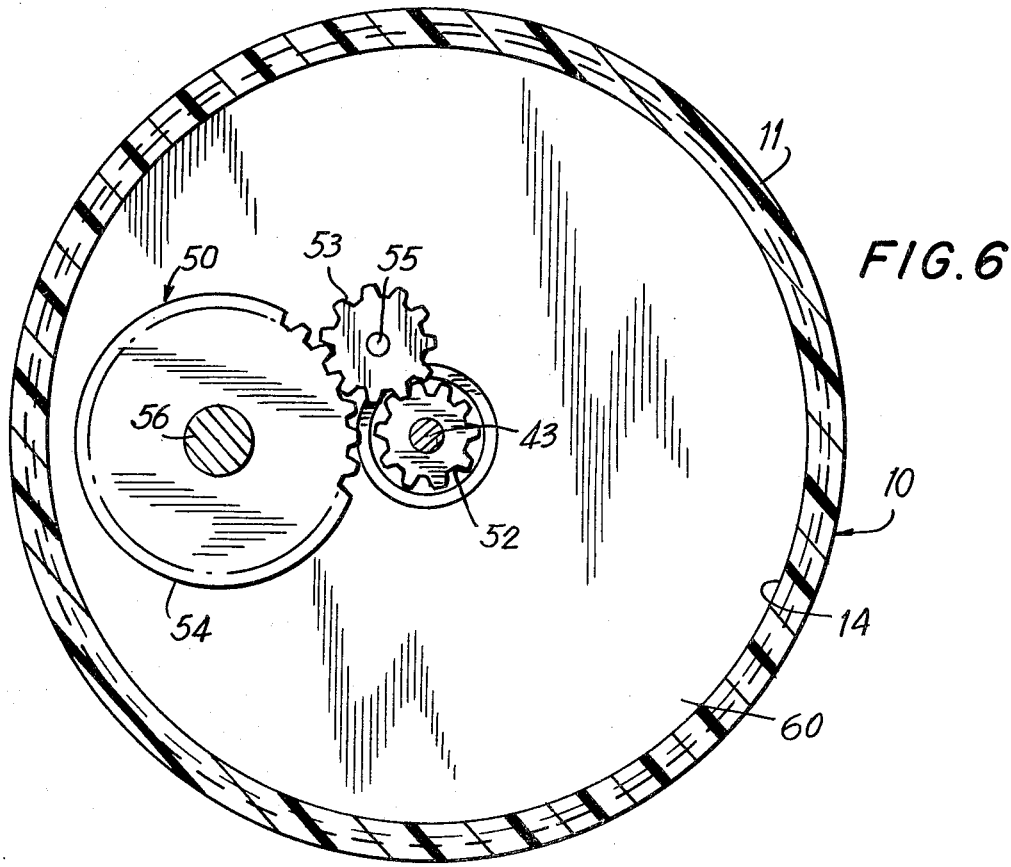
FIG. 6 is a sectional view taken along the line 6—6 in FIG. 1.

The rotor 42 is rigidly supported on a shaft 43. A spacer sleeve 44 is disposed around the shaft 43 adjacent the rotor 42, and the rotor and sleeve are enclosed by a cylindrical cover 46 of aluminum or other nonmagnetic material. The cover 46 is provided at its ends with disc-shaped bearing members 47 and 48 for the shaft 43. The cover 46 and the bearing members 47 and 48 serve to completely enclose the rotor 42 to shield the rotor from dust or other foreign matter and to provide a unitary sub-assembly. The end of this sub-assembly adjacent the bearing member 48 (the lower end, as viewed in FIG. 1) is located in a circular opening 49 in the housing flange 12 such that the shaft 43 protrudes into the recess 14. A gear train 50 is positioned in the housing recess 14. The gear train includes a pinion 52 mounted on the protruding end of the rotor shaft 43 and a pair of meshing reduction gears 53 and 54 mounted on stub shafts 55 and 56, respectively. As best seen in FIGS. 1 and 6, the shafts 55 and 56 are spaced from the cylindrical axis of the housing 10, and the shaft 56 is provided with an output pinion 58 at the end thereof opposite that adjacent the gear 54.

A disc-shaped plate 60 of plastic or other non-magnetic material serves to close the housing recess 14 and thereby enclose the gear train 50. The shaft 56 protrudes through the plate 60 with the output pinion 58 affixed to the protruding end of the shaft. In the illustrated embodiment, the plate 60 is maintained in position by means of a snap fit.

Upon the application of alternating current to the energizing winding 35, the rotor 42 automatically begins rotating in the prescribed direction and reaches synchronous speed within the first cycle of the applied wave form. This substantially instantaneous and unidirectional starting characteristic is achieved by the quiescent stopping position of the rotor (the position illustrated in FIG. 5) in which the rotor poles N and S are directly opposite the shaded stator poles 22 and 25. The stopping position results not only through the use of shaded stator poles but by reason of a nonuniform air gap between the stator poles and the rotor. This is accomplished by locating the shaded poles 22 and 25 closer to the axis of the rotor than the unshaded poles 23 and 24. The difference in distance advantageously is one-half the thickness of the stator material. The resulting distortion of the flux pattern and the reduction in gap reluctance causes the rotor to stop with its poles opposite the shaded poles. When current is applied to the winding, the initial flux build-up occurs in the unshaded poles, and since the rotor is in line with the shaded poles a strong starting impulse is produced.

The stator assembly 15 and the rotor assembly 40 comprise completely separate sub-assemblies which greatly facilitate the manufacture of the motor. The stator is assembled by nesting the shaded ring 27 and the pole piece 18 within the cup-shaped pole piece 17 and by similarly nesting the shaded ring 28 and the pole piece 19 within the cup-shaped pole piece 20. The two stator halves are then stacked in oppositely disposed relationship with each other and with the stator poles projecting in opposite directions to form a cylindrical array. The energizing winding 35 is located within the cylindrical enclosure provided by the peripheral flanges 32 and 33 of the respective pole pieces 17 and 20, and the winding terminals 37 and 38 are lead through appropriate openings in these flanges. In some embodiments a tape or band (not shown herein but illustrated in the aforementioned Haydon U.S. Pat. No. 3,495,113, for example) may be secured around the abutting flanges 32 and 33 to complete the stator sub-assembly.

To form the rotor sub-assembly 40, the bearing 47 is staked within one end of the nonmagnetic cover 46. The shaft 43 and the attached rotor 42 are deposited within the cover, and the sleeve 44, the bearing 48 and the pinion 52 are located in position around the shaft. The rotor 42 is encased in this manner within the cover 46 prior to the final assembly of the motor in order to protect the rotor from dirt or other foreign matter that might otherwise accumulate in the rotor-stator air gap during the assembly procedure.

The use of the unitary one-piece cylindrical housing 10 greatly facilitates the assembly of the motor. As indicated heretofore, the housing 10 is of H-shaped axial cross section to form the cylindrical recesses 13 and 14 in its opposite ends, and the central flange 12 is provided with the axial opening 49. The opening 49 serves as a locating recess for the rotor assembly 40, while the housing recess 13 serves to locate the stator assembly 15. The gear train 50, on the other hand, is positioned within the recess 14 and is enclosed by the plate 60.

In one advantageous embodiment of the method of making the motor, the housing 10 is positioned with the cylindrical recess 14 extending in an upward direction. The rotor assembly 40 is located in the downwardly extending recess 13, and the gear train 50 is assembled within the recess 14, with the gear 53 in meshing engagement with the rotor pinion 42. The plate 60 is then snapped in place, and the output pinion 58 is keyed or otherwise secured to the shaft 56. The housing 10 is thereupon inverted such that its recess 13 extends in an upward direction. The stator assembly 15 is located in this latter recess around the rotor assembly with the lead wires 37 and 38 extending through the side opening 39 in the housing.

In another preferred embodiment of the assembly procedure, the housing 10 is positioned such that the recess 13 extends in an upward direction. The rotor assembly 40 and the stator assembly 15 are positioned within the recess 13, the housing is inverted, and the gear train 50 and the cover 60 are located within the recess 14. Each of the component parts of the motor is located in position within the housing 10 in a manner that is readily adaptable to mass production assembly techniques.

Electric motors in accordance with the invention also are particularly useful as stepping motors. Upon the application of successive current pulses to the energizing winding 35, the rotor 40 moves through discrete increments or steps and comes to rest substantially instantaneously upon the termination of each pulse. Through the use of a suitable permanent biasing magnet (not shown herein but illustrated in the above Haydon U.S. Pat. No. 3,495,107, for example), the rotor may be arranged to rotate through a complete 360° revolution in response to each of the applied pulses.

In addition, suitable electrical or electro-mechanical circuits may be employed for converting a source of direct current into a series of unipolar pulses to operate the machine as a "brushless" DC motor. Conversely, by applying driving power to the pinion 52, the machine may serve as a generator to produce an AC signal at the winding terminals 37 and 38.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A method of making an electrical rotating machine, comprising the steps of:
    positioning a unitary one-piece housing having recesses in opposite ends thereof with the recess in one of its ends opening in an upward direction;
    assembling a multipart stator by stacking a plurality of pole pieces in oppositely disposed relationship with each other, two of the pole pieces being provided with peripheral flanges to form a cylindrical enclosure;
    inserting a winding within the cylindrical enclosure;
    thereafter depositing the stator assembly in the recess in said upwardly opening end of the housing;
    inserting a rotor assembly in the recess in said upwardly opening end of said housing, the rotor assembly including a rotor shaft extending into the recess in the other end of said housing;
    inverting said housing such that the recess in its other end extends in an upward direction; and
    positioning a gear train in the recess in said other end of said housing, the gear train including a pinion mounted on the rotor shaft and at least one reduction gear in meshing engagement with said pinion.

2. The method as defined in claim 1, in which the rotor assembly and the gear train are inserted in their respective recesses prior to the insertion of the stator assembly in said one recess.

3. A method of making an electric rotating machine, comprising the steps of:
    molding a nonmagnetic cylindrical housing of H-shaped axial cross section to form cylindrical recesses in opposite ends thereof;
    positioning the thus molded housing with the recess in one of its ends opening in an upward direction;
    assembling a multipart stator by stacking a plurality of annular pole pieces in oppositely disposed relationship with each other;
    locating an energizing winding in magnetic flux relationship with the stator;
    thereafter depositing the stator in the recess in said upwardly opening end of the cylindrical housing;
    inserting a rotor assembly in the recess in said upwardly opening end of said housing, the rotor assembly including a nonsalient pole rotor and a shaft supporting said rotor and extending into the cylindrical recess in the other end of said housing;
    inverting said housing such that the recess in its other end extends in an upward direction; and
    positioning a gear train in the recess in said other end of said housing, the gear train including a pinion mounted on the rotor shaft and at least one reduction gear in meshing engagement with said pinion.

4. The method as defined in claim 3, in which the stator is of cylindrical configuration and defines a central orifice, the rotor assembly being inserted in said central orifice.

5. A method of making an electric rotating machine, comprising the steps of:
    molding a nonmagnetic one-piece cylindrical housing of H-shaped axial cross section to form an intermediate flange having a central opening and cylindrical recesses in opposite ends thereof;
    positioning the thus molded housing with the recess in one of its ends opening in an upward direction;

assembling a multipart centrally orificed stator by stacking a plurality of annular pole pieces in oppositely disposed relationship with each other, two of the pole pieces being provided with peripheral flanges to form a cylindrical enclosure;

inserting a winding within the cylindrical enclosure;

thereafter depositing the stator assembly with the winding inserted within said enclosure in the recess in said upwardly opening end of the cylindrical housing;

inserting a rotor assembly in the recess in said upwardly opening end of said housing within the central orifice of said stator, the rotor assembly including an elongate stationary nonmagnetic cover, a nonsalient pole rotor rotatably positioned within said cover and having an axial length greater than its diameter, and a shaft supporting said rotor and extending into the cylindrical recess in the other end of said housing;

affixing one end of said nonmagnetic cover within the central opening of said housing flange, the other end of said cover being maintained within the central orifice of said stator assembly;

inverting said housing such that the recess in its other end extends in an upward direction; and positioning a gear train in the recess in said other end of said housing, the gear train including a pinion mounted on the rotor shaft and at least one reduction gear in meshing engagement with said pinion.

6. The method as defined in claim 5, which comprises the further step of:

closing the recess in said other end of said housing with a cover plate to enclose the gear train.

7. A method of making an electric rotating machine, comrising of steps of:

forming a unitary one-piece housing having recesses in opposite ends thereof;

positioning the thus formed housing with the recess in one end thereof opening in an upward direction;

assembling a multipart stator by stacking a plurality of pole pieces in oppositely disposed relationship with each other, each of the pole pieces having a salient stator pole and the pole pieces being stacked such that the stator poles project in opposite directions, two of the pole pieces being provided with peripheral flanges to form an enclosure;

inserting a winding within said enclosure;

thereafter depositing the stator assembly with the winding inserted within said enclosure in the recess in said upwardly opening end of the housing;

inserting a rotor assembly in the recess in said upwardly opening end of said housing, the rotor assembly including a rotor shaft extending into the recess in the other end of said housing;

inverting said housing such that the recess in its other end extends in an upward direction; and positioning a gear train in the recess in said other end of said housing, the gear train including a pinion mounted on the rotor shaft and at least one reduction gear in meshing engagement with said pinion.

8. The method as defined in claim 7, in which the housing is formed by molding the same of nonmagnetic material.

9. A method of making an electric rotating machine, comprising the steps of:

molding cylindrical housing of nonmagnetic material and of H-shaped axial cross section to provide cylindrical recesses in opposite ends thereof;

positioning the thus formed housing with the recess in one end thereof opening in an upward direction;

assembling a multipart stator by stacking a plurality of annular pole pieces in oppositely disposed relationship with each other, two of the pole pieces being provided with peripheral flanges to form a cylindrical enclosure;

inserting an energizing winding within the cylindrical enclosure;

depositing the stator assembly in the recess in said upwardly opening end of the cylindrical housing;

inserting a rotor assembly in the recess in said upwardly opening end of said housing, the rotor assembly including a rotor and a shaft supporting said rotor and extending into the cylindrical recess in the other end of said housing;

inverting said housing such that the recess in its other end extends in an upward direction; and positioning a gear train in the recess in said other end of said housing, the gear train including a pinion mounted on the rotor shaft and at least one reduction gear in meshing engagement with said pinion.

10. A method of making an electric rotating machine, comprising the steps of:

molding a unitary one-piece cylindrical housing of nonmagnetic material and of H-shaped axial cross section to form an intermediate flange having a central opening and cylindrical recesses in opposite ends thereof;

positioning the thus formed housing with the recess in one end thereof opening in an upward direction;

assembling a multipart stator by stacking a plurality of annular pole pieces in oppositely disposed relationship with each other, two of the pole pieces being provided with peripheral flanges to form a cylindrical enclosure;

inserting a winding within the cylindrical enclosure;

depositing the stator assembly in the recess in said upwardly opening end of said housing, the rotor assembly including an elongate stationary nonmagnetic cover, a nonsalient pole rotor rotatably positioned within said cover and having an axial length greater than its diameter, and a shaft supporting said rotor and extending into the cylincrical recess in the other end of said housing;

affixing one end of said nonmagnetic cover within the central opening of said housing flange;

inverting said housing such that the recess in its other end extends in an upward direction; and positioning a gear train in the recess in said other end of said housing, the gear train including a pinion mounted on the rotor shaft and at least one reduction gear in meshing engagement with said pinion.

11. A method of making an electric rotating machine, comrising the steps of:

molding a unitary one-piece cylindrical housing of thermoplastic material and of H-shaped axial cross section to form an intermediate flange having a central opening and cylindrical recesses in opposite ends thereof;

positioning the thus formed housing with the recess in one end thereof, opening in an upward direction;

assembling a multipart centrally orificed stator by stacking a plurality of annular pole pieces in oppositely disposed relationship with each other, each of the pole pieces having only a single salient stator pole projecting perpendicularly from adjacent the margin of the stator orifice and the pole pieces being stacked such that the stator poles project in opposite directions and are arranged in diametrically opposed pairs to form a cylindrical array, two of the pole pieces being provided with peripheral flanges to form a cylindrical enclosure;

inserting an energizing winding within the cylindrical enclosure;

depositing the assembled stator in the recess in said upwardly opening end of the cylindrical housing;

inserting a rotor assembly in the recess in said upwardly opening end of said housing within the central orifice of said stator, the rotor assembly including an elongate stationary nonmagnetic cover, a nonsalient pole rotor rotatably positioned within said cover and having an axial length greater than its diameter, and a shaft supporting said rotor and extending into the cylindrical recess in the other end of said housing;

affixing one end of said nonmagnetic cover within the central opening of said housing flange, the other end of said cover being maintained within the central orifice of said stator assembly;

inverting said housing such that the recess in its other end extends in an upward direction;

positioning a gear train in the recess in said other end of said housing, the gear train including a pinion mounted on the rotor shaft and at least one reduction gear in meshing engagement with said pinion; and closing the recess in the other end of said housing with a cover plate to enclose the gear train.

* * * * *